Figure 1:
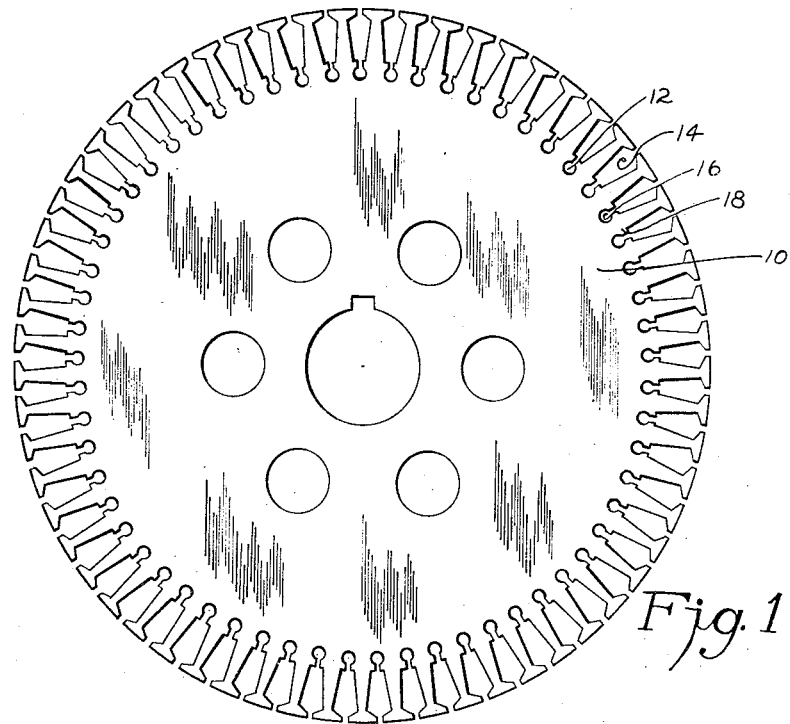

July 20, 1943.  M. SCHIFF  2,324,728
ALTERNATING CURRENT MOTOR
Filed Aug. 4, 1940

INVENTOR:
MARTIN SCHIFF
BY
Roy W. Eilers
ATTORNEYS.

Patented July 20, 1943

2,324,728

UNITED STATES PATENT OFFICE 2,324,728

ALTERNATING CURRENT MOTOR

Martin Schiff, Webster Groves, Mo., assignor to Century Electric Company, St. Louis, Mo., a corporation of Missouri Application August 4, 1940, Serial No. 351,327

1 Claim. (Cl. 172—120)

This invention relates to improvements in single or multi-phase automatic starting alternating current motors. More particularly, the invention relates to single or multi-phase automatic starting alternating current motors having a rotor provided with both a starting and a running winding.

Manufacturers of alternating current induction motors have made different types of motors in attempts to attain a motor that is easy to manufacture, which has low starting current, high starting torque, high power factor, and good cooling characteristics. Various forms of motors have been made in these attempts, including a wound rotor type of induction motor that uses some form of secondary starting arrangement, a double squirrel cage induction motor, and induction motors having a squirrel cage winding and a coil winding on the rotor. The latter type of motor has been found to possess more of the desirable operating characteristics than the other two types. The motors having double squirrel cage rotors can be made to produce a high starting torque, but they would then have an excessive starting current and a rather low power factor. The existence of these conditions prevents the efficient operation of this type of motor at starting. The motors that have a single high resistance cage winding have desirable starting characteristics, but have rather poor operating characteristics in the matter of speed and cooling. For the above reasons, these motors have not been completely satisfactory.

It has been found that these motors having a squirrel cage winding and a coil winding on the rotor are somewhat more satisfactory. This latter type of motor ordinarily has a starting winding of relatively high resistance near the periphery of the rotor and a running winding of relatively low resistance a short distance below the starting winding. Such motors have desirable starting and operating characteristics, with the exception that the rotors tend to run rather hot, and are expensive to manufacture. The invention obviates the problems of heating and expensive manufacture of rotors having a squirrel cage winding and a coil winding thereon, by providing a rotor which has a running winding at its periphery and a starting winding a short distance below the running winding. Since the running winding is located at the periphery of the rotor, it can be inserted in the slots rather easily and can be cooled very readily. Such an arrangement of windings fosters the cooling of the running winding and the inexpensive construction of the motor.

Motors of this type have been made heretofore, but they have not been completely satisfactory because the slots on the rotor have been arranged so that the starting winding has a relatively large leakage reactance. This arrangement of the slots was thought necessary to limit the starting current. The relatively large leakage reactance of the starting winding does help in the limiting of the starting current, but results in low power factor and low starting torque for the motors. As a result, these motors have not been entirely satisfactory. The present invention provides a motor which has the advantages of low starting current, efficient cooling, high starting torque, high power factor, and other good operating characteristics. This is accomplished by providing a rotor that has a relatively low resistance running winding at its periphery, a relatively high resistance starting winding embedded in the rotor a short distance below the running winding, and rotor slots which produce a low leakage reactance for the starting winding. It is, therefore, an object of the present invention to provide a rotor for single or multi-phase automatic starting alternating current motors that has a running winding of relatively low resistance and low leakage reactance, and a starting winding that has a relatively high resistance and a low leakage reactance.

Other objects and advantages of the invention will appear from the drawing and accompanying description.

In the drawing and accompanying description, a preferred form of the invention has been shown and described but it is to be understood that the drawing and accompanying description do not limit the invention and the invention will be defined by the appended claim.

Figure 2:
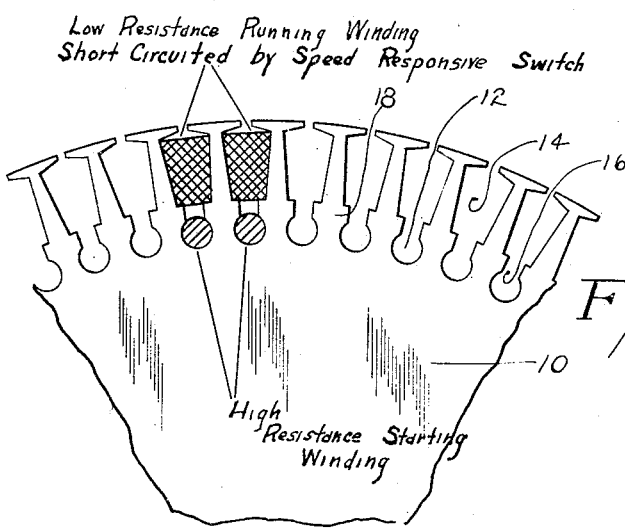

In the drawing,

Fig. 1 is a view of a punching for the rotor of an automatic starting, single or multi-phase alternating current motor made in accordance with the principles of the invention; and Fig. 2 is an enlarged view of a portion of the punching shown in Fig. 1.

Referring to the drawing in detail, a punching for a rotor on an automatic starting, single or multi-phase, alternating current motor is denoted by the numeral 10. A number of slots 12 are formed in the rotor 10 that have an upper portion 14 and a lower portion 16. The low leakage reactance is obtained by reason of the arrangement of the windings in the slots 12 and by the shape and proportion of the slots relative to the magnetic material of the teeth between the slots and the depth of the slots. The following relation between the teeth and slots is approximate: the slot depth is twice the tooth pitch at the periphery, the slots are twice as wide at the outer end as at the bottom, the teeth are twice as wide at the root as at the neck and the slot area is twice the tooth area. Considering a single rotor lamination, an annular peripheral band thereof shows the usual alternate arrangement of teeth and slots. Each tooth has a T-shaped head at the periphery, a neck or narrow portion immediately below the head and increases in width towards the bottom or base merging with the central portion of the lamination. The slots are widest at their outer ends beneath the heads of adjacent teeth. The bottom of a slot is that portion nearest the axis of the lamination corresponding to the bases of the teeth. The area of a slot is the open area between adjacent teeth below the head portions of such teeth. The area of a tooth is the surface area of the lamination between adjacent slots. The projections 18 on the sides of the slots 12 extend toward each other and cooperate with each other to provide a low leakage reactance for the winding positioned in the lower portions 16 of the slots 12. The lower portions 16 of the slots 12 are arranged to receive a winding of relatively high resistance which serves as a starting winding. This winding may be of the squirrel cage type. Such a winding may be inserted in the lower portions of the slots with little difficulty, whereas a coil winding could not be inserted in the lower portions of the slots without difficulty. The use of such a winding, therefore, results in a lower cost of construction for the motor. A squirrel cage winding may be used as a starting winding because the starting winding is short-circuited at all times. This winding preferably has a high ohmic resistance. Such a high resistance is advantageous baceuse it results in a low starting current and a high starting torque for the motor. The upper portions 14 of the slots 12 are arranged to receive a relatively low resistance winding which serves as a running winding. Since this winding has low resistance, it can not be short-circuited at all times because the starting current therein would be excessive. This winding, therefore, is not short-circuited until some time after the rotor has started to rotate. The short-circuiting is done by any of a number of the centrifugally operated switches known to those skilled in the art. Because the running winding is not short-circuited at all times and because squirrel cage windings are short-circuited at all times, the running winding cannot be of the squirrel cage type. The running winding, therefore, is preferably a coil winding that is commuted. The provision of a running winding that has low resistance results in the attainment of good operating characteristics, such as good speed regulation and high efficiency; and the positioning of the running winding at the periphery of the rotor permits ready cooling of the running winding.

The projections 18 on the sides of the slots 12 extend toward each other and provide a path for the magnetic flux passing through the motor. The provision of this path for the magnetic flux results in a low leakage reactance for the starting winding that is positioned in the lower portion 16 of the slots 12. The low leakage reactance of the starting winding results in the attainment of a high starting torque. This low leakage reactance cooperates with the high ohmic resistance of the starting winding to provide a high starting torque and low starting current for the motor. These characteristics together with the good operating characteristics obtained by positioning the running winding at the periphery of the rotor cooperate to make the rotor efficient and satisfactory.

Whereas a preferred embodiment of my invention has been shown and described, it is obvious to those skilled in the art that various changes may be made in the specification without altering or affecting its scope.

What I claim is:

A rotor for an automatic starting alternating current motor having a plurality of relatively shallow slots therein arranged to receive a starting and a running winding, said running winding being positioned at the periphery of the rotor and said starting winding being positioned in the body of the rotor below the running winding, said slots having a depth substantially twice the tooth pitch at the periphery and an area substantially twice the tooth area, each slot being substantially twice as wide at the outer end as at the bottom, the teeth being approximately twice as wide at the base as at the neck, the tooth and slot arrangement providing a low leakage reactance during starting.

MARTIN SCHIFF.